United States Patent [19]

Eichhorn et al.

[11] Patent Number: 5,228,836
[45] Date of Patent: Jul. 20, 1993

[54] RUNNER FOR A PUMP

[75] Inventors: Gunther Eichhorn, Attikon; Arno Frei, Seuzach, both of Switzerland

[73] Assignee: Sulzer Brothers Limited, Winterthur, Switzerland

[21] Appl. No.: 812,571

[22] Filed: Dec. 20, 1991

[30] Foreign Application Priority Data

Dec. 21, 1990 [CH] Switzerland ............... 4110/90-1

[51] Int. Cl.[5] .................................... F04D 29/58
[52] U.S. Cl. ........................ 416/244 R; 416/213 A;
      415/170.1; 415/175; 415/177; 415/216.1
[58] Field of Search ........... 416/204 R, 213 A, 223 B,
      416/244 R; 415/170.1, 177, 178, 216.1, 175

[56] References Cited

U.S. PATENT DOCUMENTS

| | | | |
|---|---|---|---|
| 2,165,994 | 7/1939 | Zerkowitz | 415/216.1 |
| 2,601,146 | 6/1952 | Ivanoff | |
| 2,602,683 | 7/1952 | Aue | 415/216.1 |
| 3,574,473 | 4/1971 | Gaffal | 415/175 |
| 4,407,631 | 10/1983 | Schneider et al. | 416/244 R |
| 4,557,704 | 12/1985 | Ito et al. | 415/216.1 |
| 4,639,194 | 1/1987 | Bell et al. | 415/216.1 |
| 4,773,822 | 9/1988 | Jensen et al. | 415/216.1 |
| 4,778,345 | 10/1988 | Ito et al. | |
| 4,784,574 | 11/1988 | Tsuno et al. | 415/216.1 |
| 4,930,996 | 6/1990 | Jensen et al. | 415/177 |
| 4,932,836 | 6/1990 | Boster | 415/170.1 |
| 4,997,341 | 3/1991 | Lorett | 415/177 |

FOREIGN PATENT DOCUMENTS

| | | | |
|---|---|---|---|
| 178900 | 10/1983 | Japan | 416/244 R |
| 19987 | 2/1985 | Japan | 416/213 A |
| 912711 | 12/1962 | United Kingdom. | |

OTHER PUBLICATIONS

"Nuclear Fluid-Handling Equipment," *Power*, May 1974, William O'Keefe, 2 pages.
"Monitoring for Shaft Cracks on Reactor Recirculation Pumps," *Sound and Vibration*, May 1989, Koval and O'Brien, Jr. p. 12.
Patent Abstracts of Japan, vol. II, No. 352.

Primary Examiner—Edward K. Look
Assistant Examiner—James A. Larson
Attorney, Agent, or Firm—Kenyon & Kenyon

[57] ABSTRACT

The runner for pumping hot reactor liquids includes a runner body which is connected with a shaft portion which transmits a driving torque. An annular insert is disposed between a bearing sleeve projecting from the runner body and the drive shaft portion to define an annular flow path in order to guide an auxiliary flow which, in the case of an injection operation, leads cool reactor liquid to the runner in one direction of flow and, in the case of a leakage operation, leads hot reactor liquid for cooling away from the runner in an opposite direction of flow. A closed cavity is formed between the runner body and the drive shaft portion in a transition zone between the two components so as to reduce the cross-sectional area for the transfer of heat between the runner body and the drive shaft portion. The cavity is formed by a blind bore which has a diameter greater than 30% of the outer diameter of the shaft portion. The closed cavity may be evacuated or filled with a material which is a poor conductor of heat. In addition, a protective sleeve may be disposed over the region of transition between the runner body and the shaft portion.

11 Claims, 4 Drawing Sheets

RUNNER FOR A PUMP

This invention relates to a runner for a pump. More particularly, this invention relates to a runner for a pump for pumping hot reactor liquids.

As is known, circulating pumps for hot reactor liquids have been in use in the nuclear industry for decades. For example, the journal Power (11 West 19th Street, New York, N.Y. 10011) shows, in a Special Report of May 1974, a contribution from William O'Keefe: "Nuclear Fluid-Handling Equipment", in which circulating pumps are shown on page 3. A typical construction has likewise been shown under FIG. 1 in the article "Monitoring for Shaft Cracks on Reactor Recirculating Pumps" by M. G. Kowal and J. T. O'Brien, Jr., at the "2nd Annual Workshop on Reactor Coolant Recirculation Pump Monitoring" (Mar. 20–21, 1989, Electric Power Research Institute, San Francisco, Calif.) and published in "Sound and Vibration" (May 1989, page 12, FIG. 1). Pumps of this kind have a heat block along a driving shaft at which the temperature drops very sharply towards ambient temperature. However, one problem in this zone resides in the fact that because of the large drop in temperature and also because of changing operating conditions, heat cracks can form in the mechanically stressed parts of the shaft rotor.

Accordingly, it is an object of the invention to alter the heat transmission in a drive shaft of a pump for pumping hot reactor liquids so that heat cracks are avoided.

It is another object of the invention to be able to avoid heat cracks in a runner shaft for a compressor pump.

Briefly, the invention provides a runner for a pump which includes a runner body having a bearing sleeve and a drive shaft portion coaxially within the sleeve. In addition, the runner includes an annular insert between the shaft portions and the bearing sleeve to define a flow path between the shaft portion and the insert.

In accordance with the invention, the runner body is provided with a blind bore at one end which extends into the shaft portion with the bore having a diameter greater than 30% of the diameter of the shaft portion. In addition, a cover is disposed in the blind bore in order to define a closed cavity.

The blind bore is of a size in order to reduce the cross sectional area for heat to pass axially to the shaft portion. Further, the closed cavity may be evacuated or may be filled with a material which is a poor conductor of heat.

One advantage of the runner resides in the fact that the incidence of heat into the shaft portion is reduced. In addition, a more uniform distribution of temperature takes place inside one single radial section. This leads to lower differences in stress.

In another embodiment, the runner may be constructed with a runner body which is separate from the shaft portion and which is secured to the shaft portion by means of an annular weld seam. In this embodiment, the cover may be made of cup-shape so as to extend longitudinally of the blind bore within the runner body. In this case, the cover extends to a position concentrically within the weld seam while having a portion radially spaced from the runner body and axially spaced from the shaft portion in order to define the closed cavity.

In still another embodiment, the runner body and drive shaft may be made of separate components with the shaft portion having a blind bore receiving the runner body in order to define a closed cavity therebetween. In this case, the runner body is of solid construction.

In each of the above embodiments, a protective sleeve may be be mounted on the shaft portion to extend concentrically over at least a portion of the blind bore. In addition, the sleeve has a portion which is radially spaced from the shaft portion in order to define an annular cavity which is disposed in overlapping relation to the blind bore and particularly the closed cavity defined within the blind bore.

These and other objects and advantages of the invention will become more apparent from the following detailed description taken in conjunction with the accompanying drawings wherein.

Figure 1:
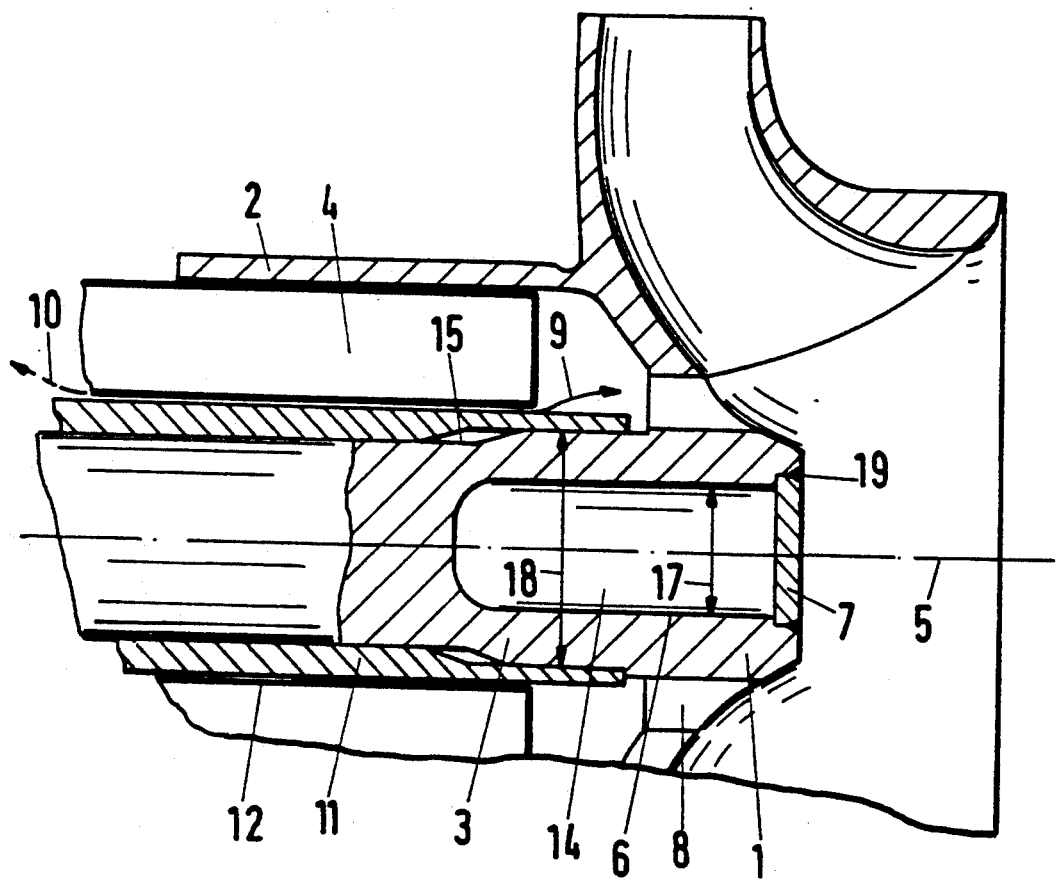
FIG. 1 illustrates a part-cross-sectional view of a runner constructed in accordance with the invention.

Referring to FIG. 1, the runner is constructed for use in a pump such as a centrifugal pump for pumping hot reactor liquids, for example in a nuclear reactor installation. The runner includes a runner body 1 having a projecting annular bearing sleeve 2 which forms a running face for a hydrostatic bearing on a shaft rotor (not shown). In addition, the runner body 1 has a drive shaft portion 3 extending coaxially within the bearing sleeve 2. This shaft portion 3 serves to transmit the driving torque.

An annular insert 4 which is connected to a non-rotating part of the pump (not shown) is disposed between the bearing sleeve 2 and the shaft portion 3 in order to define a flow path or channel for an auxiliary flow between the shaft portion 3 and the insert 4.

In the case of an injection operation, an excess amount of cooled reactor liquid is injected into the cooling region and moves in the annular flow path 12 in the direction of flow 9 through the runner body 1.

In leakage operation, a leakage amount of hot reactor liquid from the runner body 1 passes in the direction of flow 10 through the flow path 12 and is fed to a cooler, for example, being mixed into a cooling circuit (not shown). This allows the runner to be cooled down.

As shown in FIG. 1, the runner body 1 is able to rotate about an axis of rotation 5 and is provided with an overhung closed wheel having pressure-equalizing holes 8 to the back of the wheel.

In addition, the runner body 1 is provided with a blind bore 6 at one end which extends into the shaft portion 3. As indicated, this bore 6 has a diameter 17 which is greater than 30% of the diameter 18 of the shaft portion 3. The blind bore 6 serves to keep the area of the axial passage for the flow of heat small. In addition, a cover 7 of flat shape is disposed in the blind bore 6 in order to define a closed cavity 14. This cover 7 may be welded by a weld seam 19 to the end of the runner body 1.

The closed cavity 14 may be evacuated or may be filled with an inert gas or may be filled with a material which is a poor conductor of heat.

A protective sleeve 11 is mounted on the shaft portion 3 as well as over the runner body 1. In addition, the sleeve 11 extends concentrically over at least a portion of the blind bore 6 and has a portion which is spaced radially from the shaft portion 3 in order to define an annular cavity 15 therebetween. As illustrated, this annular cavity 15 is also disposed in overlapping relation to an end of the blind bore 6. Thus, the sleeve 11 serves to cover the region of transition between the runner body 1 and the shaft portion 3.

During operation, the reactor liquid which is to be circulated has a very high temperature relative to ambient temperature, for example, 300° centigrade at the entry to the runner. This causes heat to flow outwardly along the shaft portion 3 which extends from the runner body 1. Consequently, suitable shaft seals (not shown), and a cooling region are generally necessary at the outer end of the shaft portion 3 in order to block the reactor liquid against the internal pressure and in order to lead away the heat occurring in the shaft portion 3 by heat conduction.

The protective sleeve 11 which is disposed over the transition between the runner body 1 and the shaft portion 3 prevents the direct circulation of the reactor liquid in the axial direction along the outer surface of the shaft portion 3. Hence, the protective sleeve 11 has, for the shaft portion 3, a damping action in response to rapid and large differences in temperature in the reactor liquid in the flow path 12 between the insert 4 and the sleeve 11. The damping action may also be enhanced by having the sleeve 11 made of a material having a high resistance to heat.

Since the heat from the runner body 1 impinging upon the shaft portion 3 axially is restricted essentially to the reduced cross-section of the shaft portion 3 about the blind hole 6, a smaller flow of heat occurs in the axial direction. Further, this heat flow may be distributed uniformly and undisturbed to the greater cross-section behind the blind hole 6 with a corresponding drop in temperature. In the region of the transition between the runner body 1 and the shaft portion 3, the narrowest axial cross-section is overlapped by the annular cavity 15 within the protective sleeve 11. Hence, in this region, no mechanical forces are transmitted from the protective sleeve 11 to the surface of the shaft portion so that no direct heat bridge arises in this region. Since the protective sleeve 11 may move under an axial thermal expansion with respect to the shaft portion 3 at the outer surface of the shaft portion 3, the cavity 15 between the protective sleeve 11 and shaft portion 3 may fill with reactor liquid.

Figure 2:
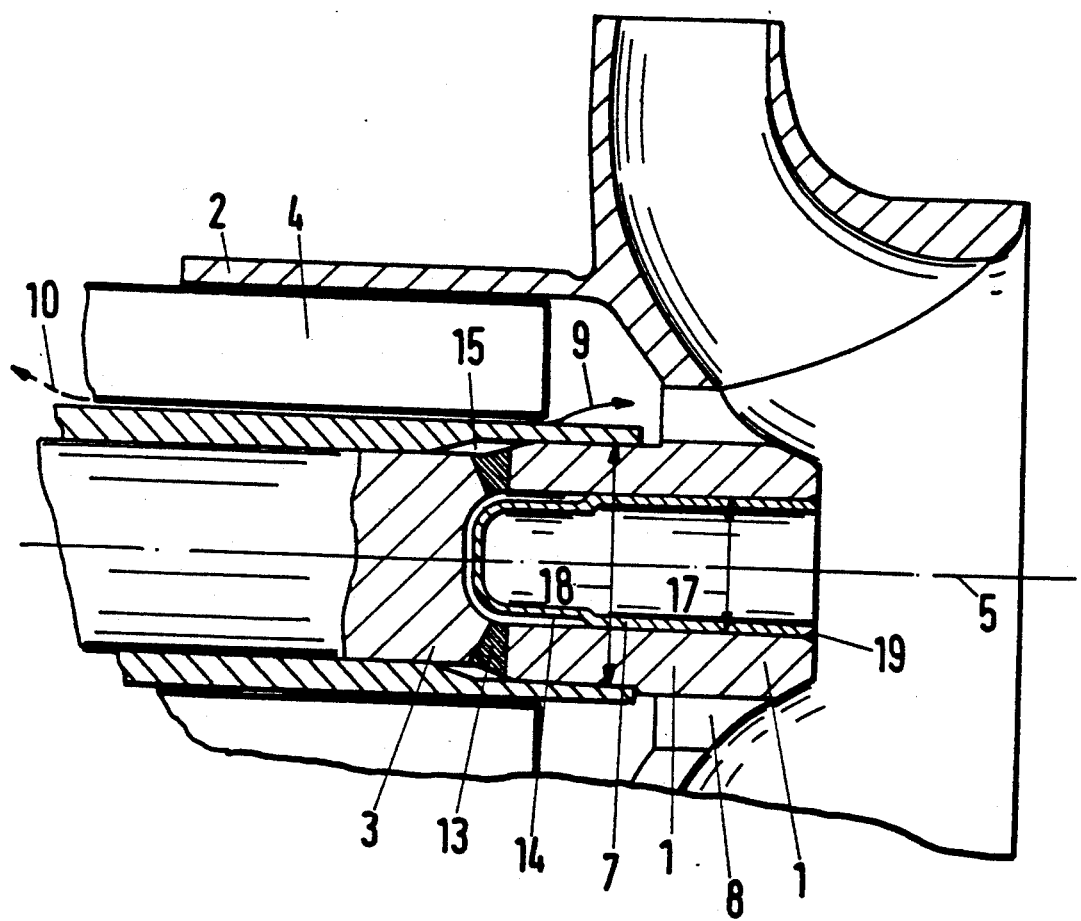
FIG. 2 illustrates a part cross-sectional view of a modified runner constructed in accordance with the invention.

Referring to FIG. 2, wherein like reference characters indicate like parts as above, the runner may be constructed with a runner body 1 which is separate from a drive shaft portion 3. As indicated, the runner body 1 has a longitudinally extending bore while the drive shaft portion 3 extends from the runner body 1 coaxially within the protective sleeve 11 and the bearing sleeve 2 and coaxially of the axis 5 of the runner body 1. In this case, an annular weld seam 13 secures the runner body 1 to the shaft portion 3. In addition, the cover 7 is cup-shaped and extends to a position concentrically within the weld seam 15 while having a portion radially spaced from the runner body 1 and axially spaced from the shaft portion 3 in order to define the closed cavity 14. To this end, as illustrated, the right-hand end of the shaft portion 3, as viewed, is provided with a recess to accommodate the cup-shaped cover 7 and to form, in part, the closed cavity 14.

As illustrated in FIG. 2, the protective sleeve 11 is spaced radially from the weld seam 13 in order to define the annular cavity 15 about the weld seam 13.

The formation of the cover 7 of cup-shape allows the introduction of a source of X-ray radiation for radiating through the weld seam 13 and the transition between the runner body 1 and the shaft portion 3 without alteration of the cover 7.

Figure 3:
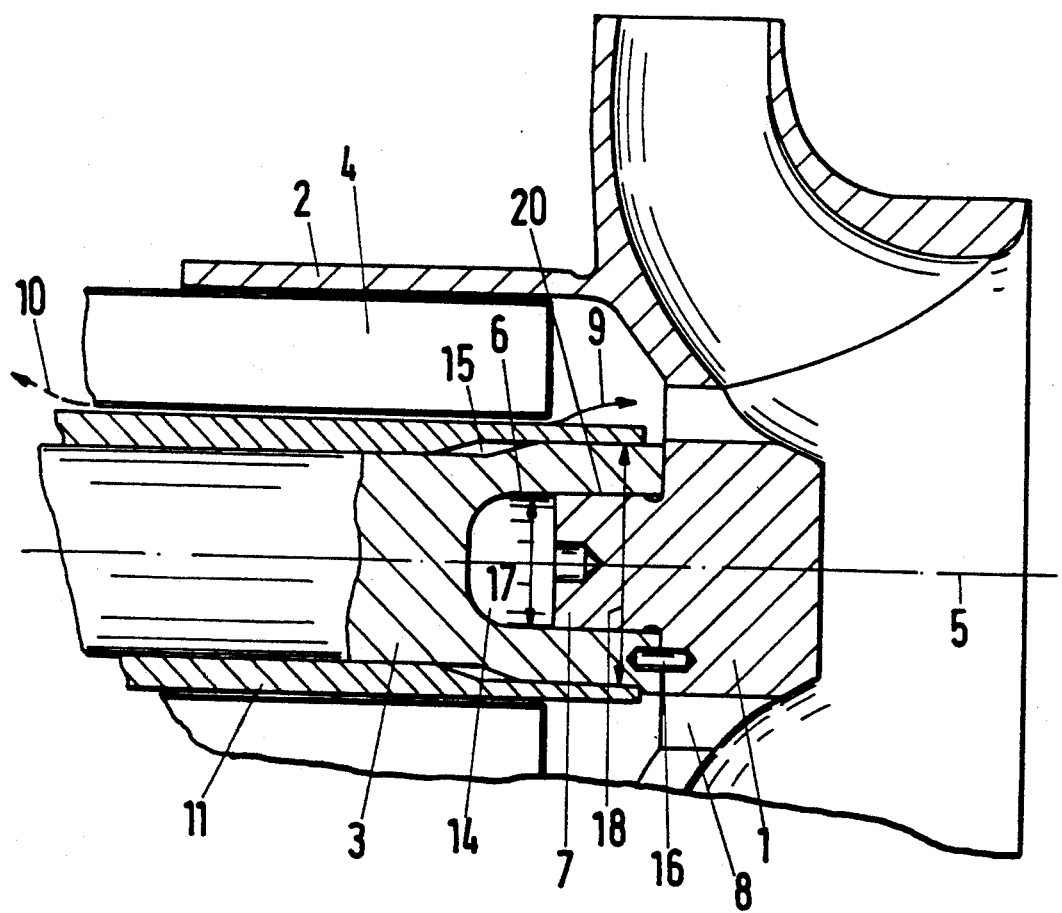
FIG. 3 illustrates a part cross-sectional view of a further modified runner constructed in accordance with the invention.
Figure 4:
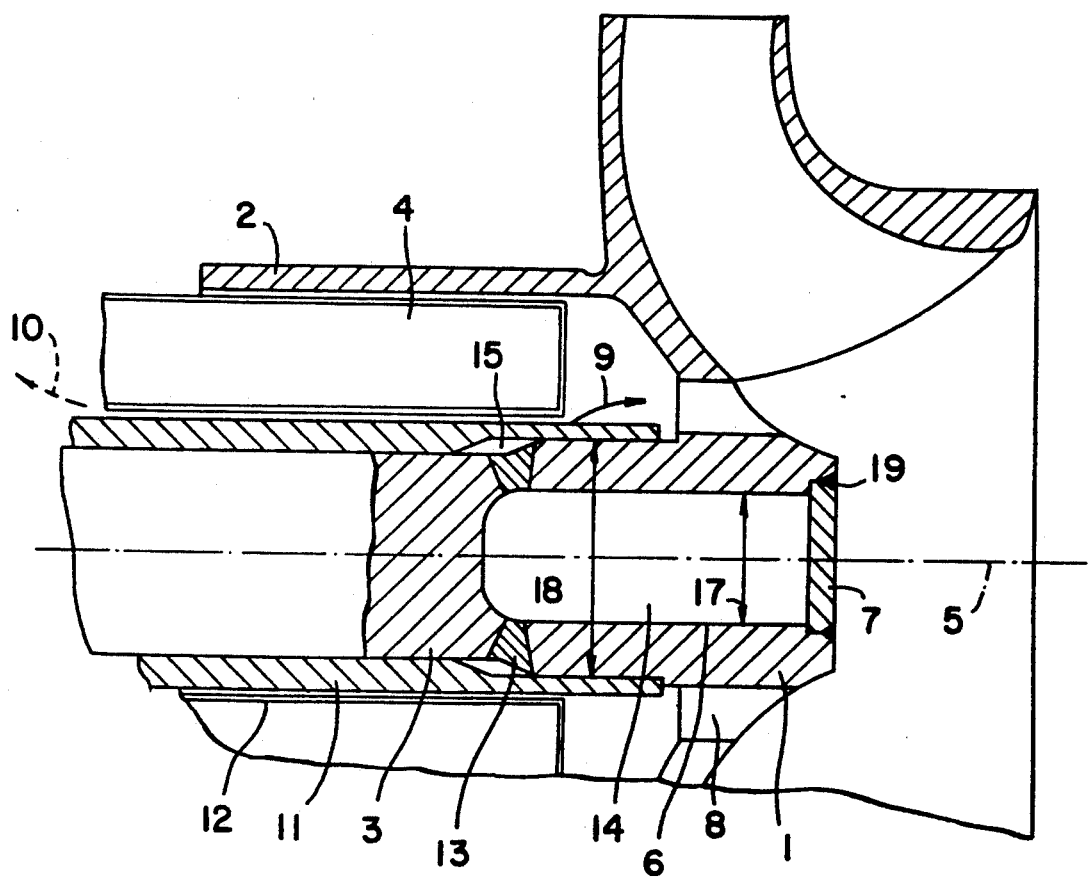
FIG. 4 illustrates a part cross-sectional view of a further modified runner constructed in accordance with the invention.

Referring to FIG. 3, wherein like reference characters indicates like parts as above, the runner may be constructed with a runner body 1 of solid construction and a drive shaft portion 3 which extends coaxially of the runner body 1 on the central axis 5. In addition, the shaft portion 3 is provided with a blind bore 6 to receive the runner body 1 therein in order to define the closed cavity 14 therebetween. As above, the blind bore 6 has a diameter 17 which is greater than 30% of the diameter 18 of the shaft portion. In addition, the runner body 1 and shaft portion 3 may be connected by a shrink fit 20. In this embodiment, a stem-like portion of the runner body 1 forms a cover 7 within the blind bore 6 of the shaft portion 3.

The protective sleeve 11 is mounted on the shaft portion 3 and has a portion radially spaced from the shaft portion 3 to define the annular cavity 15 concentrically about the closed cavity 14. To this end, as viewed, the shaft portion 3 has an enlarged end portion about the stem of the runner body 1 so as to form a shoulder or step by which the annular cavity 15 is defined, in part.

While the runner body 1 and shaft portion 3 are connected together in a gas tight manner, driving torque may be transmitted between the shaft portion 3 and runner body 1 by means of dowels 16 extending into the shaft portion 3 and runner body 1. Of note, only one dowel 16 is shown for simplicity.

The invention thus provides a runner for a pump in which the area for heat to pass axially from a runner body to a drive shaft portion is reduced. As a result, a risk of cracks forming due to heat stressing between the runner body and drive shaft portion can be substantially reduced.

What is claimed is:

1. A runner for a pump comprising
a runner body having a bearing sleeve and a drive shaft portion coaxially within the sleeve, said runner body having a blind bore at one end extending into said shaft portion, said bore having a diameter greater than 30% of the diameter of said shaft portion;
an annular insert between said shaft portion and said sleeve to define a flow path between said shaft portion and said insert; and
a flat-shaped cover disposed in said blind bore to define a closed cavity, wherein a material having a poor heat conducting characteristic is included within said cavity.

2. A runner as set forth in claim 1 which further comprises a protective sleeve mounted on said shaft portion and extending concentrically over at least a portion of said blind bore, wherein said protective sleeve has a portion spaced from said shaft portion to define an annular cavity therebetween, said annular cavity being disposed in overlapping relation to said blind bore.

3. A runner for a pump comprising
a runner body having a bearing sleeve and a drive shaft portion coaxially within the sleeve, said runner body having a blind bore at one end extending into said shaft portion, said bore having a diameter greater than 30% of the diameter of said shaft portion;
an annular insert between said shaft portion and said sleeve to define a flow path between said shaft portion and said insert; and
a cover disposed in said blind bore to define a closed cavity, wherein a material having a poor heat conducting characteristic is included within said cavity and, wherein said cover is of cup-shape and extends into said blind bore.

4. A runner as set forth in claim 3 which further comprises a protective sleeve mounted on said shaft portion and extending concentrically over at least a portion of said blind bore, wherein said protective sleeve has a portion paced from said shaft portion to define an annular cavity therebetween, said annular cavity being disposed in overlapping relation to said blind bore.

5. A runner for a pump comprising
a runner body having a longitudinally extending blind bore on a central axis thereof, said bore having a diameter of greater than 30% of a diameter of said runner body;
a bearing sleeve extending from said body;
a drive shaft portion extending from said body coaxially within said sleeve and coaxially of said axis;
an annular weld seam securing said body to said shaft portion;
an annular insert between said shaft portion and said sleeve to define a flow path between said shaft portion and said insert; and
a flat-shaped cover in said body to close said blind bore and to define a closed cavity in said body, wherein a material having a poor heat conducting characteristic is included in said cavity.

6. A runner as set forth in claim 5 which further comprises a protective sleeve mounted on said shaft portion and extending concentrically over at least a portion of said blind bore, wherein said protective sleeve has a portion spaced from said shaft portion to define an annular cavity therebetween, said annular cavity being disposed in overlapping relation to said blind bore, and wherein said protective sleeve is radially spaced from said weld seam to define a cavity therebetween.

7. A runner for a pump comprising a runner body having a longitudinally extending blind bore on a central axis thereof, said bore having a diameter of greater than 30% of a diameter of said runner body;
a bearing sleeve extending from said body;
a drive shaft portion extending from said body coaxially within said sleeve and coaxially of said axis;
an annular weld seam securing said body to said shaft portion;
an annular insert between said shaft portion and said sleeve to define a flow path between said shaft portion and said insert; and
a cup-shaped cover in said body to close said blind bore and to define a closed cavity in said body, said cup-shaped cover extending into said blind bore, wherein a material having a poor heat conducting characteristic is included in said cavity.

8. A runner as set forth in claim 7 which further comprises a protective sleeve mounted on said shaft portion and said body, said protective sleeve being radially spaced from said weld seam to define a cavity therebetween.

9. A runner as set forth in claim 8 wherein said cover extends to a position concentrically within said weld seam while having a portion radially spaced from said body and axially spaced from said shaft portion to define said closed cavity.

10. A runner as set forth in claim 7 which further comprises a protective sleeve mounted on said shaft portion and extending concentrically over at least a portion of said blind bore, wherein said protective sleeve has a portion spaced from said shaft portion to define an annular cavity therebetween, said annular cavity being disposed in overlapping relation to said blind bore, and wherein said protective sleeve is radially spaced from said weld seam to define a cavity therebetween.

11. A runner for a pump comprising
a runner body;
a bearing sleeve extending from said body;
a drive shaft portion extending coaxially of said body and within said bearing sleeve, said shaft portion having a blind bore receiving said runner body therein to define a closed cavity therebetween, said bore having a diameter greater than 30% of the diameter of the shaft portion;
an annular insert between said shaft portion and said sleeve to define a flow path between said shaft portion and said insert; and
a sleeve mounted on said shaft portion within said insert and having a portion radially spaced from said shaft portion to define an annular cavity concentrically about said closed cavity.

* * * * *